United States Patent [19]
Lueck

[11] 3,830,572
[45] Aug. 20, 1974

[54] OPTICAL SENSOR SYSTEM
[75] Inventor: Arthur M. Lueck, East Setauket, N.Y.
[73] Assignee: Quantum Sensing, Incorporated, Bohemia, N.Y.
[22] Filed: Apr. 11, 1973
[21] Appl. No.: 350,077

Related U.S. Application Data
[63] Continuation-in-part of Ser. No. 139,501, May 3, 1971, abandoned.

[52] U.S. Cl. ............................................. 356/156
[51] Int. Cl. .......................................... G01b 11/00
[58] Field of Search ............ 350/211; 356/156, 201

[56] References Cited
UNITED STATES PATENTS
2,911,881  11/1959  Franklin ............................ 356/201
3,535,533  10/1970  Guidi .................................. 356/201
3,562,408  2/1971   Collins et al. ....................... 350/211

Primary Examiner—William L. Sikes

[57] ABSTRACT

A pair of large-area, short focal length lenses define an elongated viewing area, with a light source located at the focal point behind one lens and a sensor at the focal point behind the other. To achieve an analog output, one or both lenses are masked for uniform light intensity. The intrusion of an object (a web of solid material, particles in gases, etc.,) into the viewing area decreases the electrical signal produced by the sensor in analog fashion. A control function, such as motor speed, a damper, etc. may be directly controlled by the sensor output. The system is low in cost and highly reliable.

2 Claims, 5 Drawing Figures

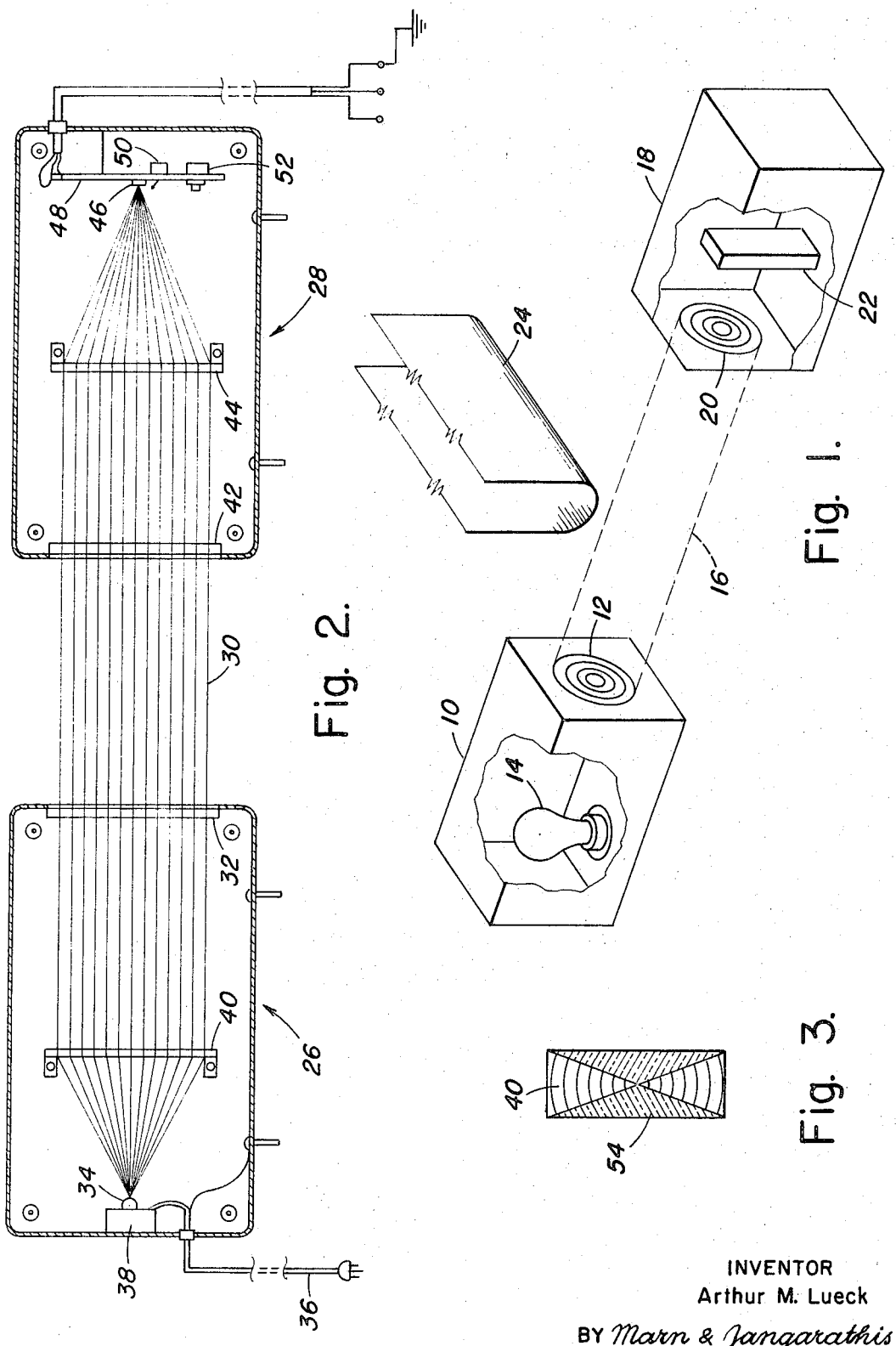

OPTICAL SENSOR SYSTEM

RELATED APPLICATION

This application is a continuation-in-part of U.S. application Ser. No. 139,501 filed 3 May 1971, now abandoned.

BACKGROUND OF THE INVENTION

This invention relates generally to optical sensing systems and, more particularly, to an optical sensing system having an analog output signal directly usable in a control function. The invention finds application in the contactless measurement of position of an opaque body.

In situations where it is desired to determine the position of an object but undesirable or impossible to touch the object, optical sensing systems have found broad application. In its simplest form, a point source of light and a photocell cooperate to give a "yes" or "no" answer as to whether the object occupies the space therebetween. Arrays of such sources and sensors find a variety of applications, such as in reading a punched tape, but they are quite crude in measuring linear position. Use of a scanning source or a line source with an array of sensors is also possible, but none of these devices are either simple enough, or rugged enough, or in many cases accurate enough, to be economically adopted for use in the control of high speed industrial processes.

OBJECTS OF THE INVENTION

It is an object of the present invention to overcome the defects of prior optical sensing systems and provide an economic, rugged and reliable sensing system which has a truly analog response.

Various other objects and advantages of the invention will become clear from the following description of embodiments thereof, and the novel features will be particularly pointed out in connection with the appended claims.

THE DRAWINGS

In the accompanying drawings:

FIG. 1 is a simplified schematic perspective view of an embodiment of the invention;

FIG. 2 is a more detailed schematic diagram of the invention;

FIG. 3 illustrates the lens mask design employed in the FIG. 2 embodiment;

DESCRIPTION OF EMBODIMENTS

Figure 4:
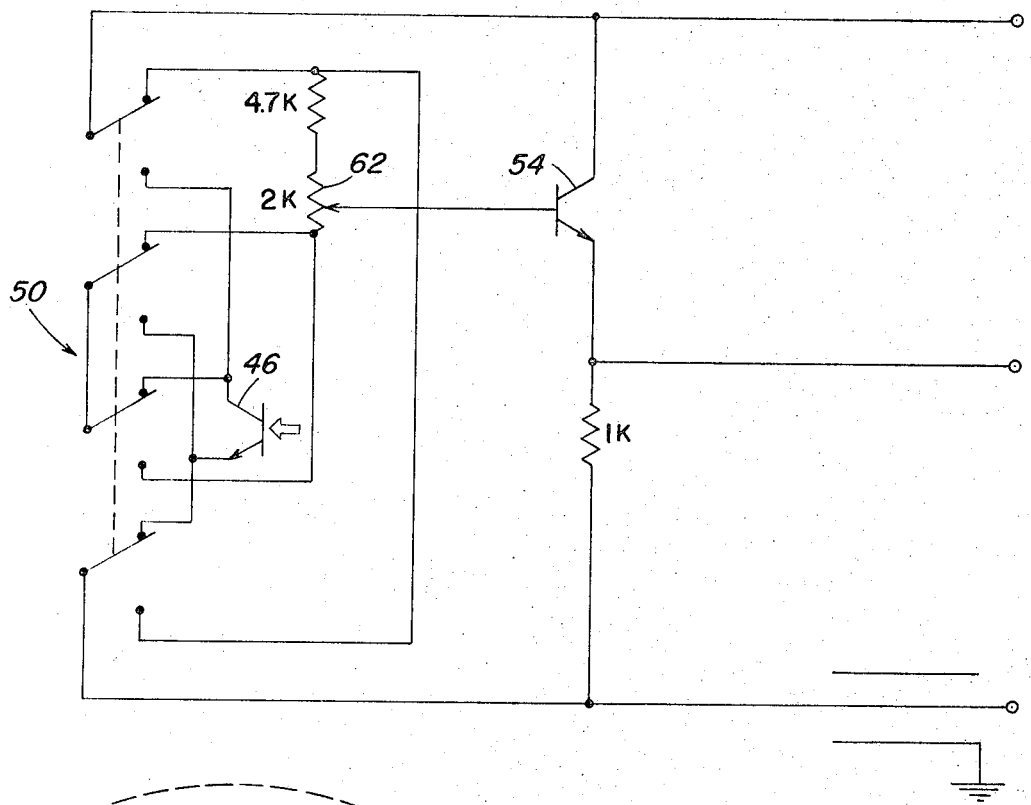
FIG. 4 is a circuit diagram for a light sensor circuit including the reversing switch of the FIG. 2 embodiment.

In essence, the present invention comprises the use of a pair of identical but oppositely oriented large-area lenses or lens segments located between a single light source and a single sensor. The lens nearest the source enlarges the field or viewing area and collimates light from the source. At the opposite end of the viewing area, the second, reversed lens reduces the size of the image (the source) to the size of the source, at its focal point. A single sensor is located at this focal point, and produces a signal directly proportional to the amount of light received and inversely proportional to that portion of the viewing area blocked by the object whose position is being sensed. This signal is readily transferred to the necessary control function.

The light source required will, of course, vary with the size and depth of the viewing area, but it should have a long operating life at a constant intensity, to avoid the need for periodic recalibration. In certain applications, a light emitting diode is a satisfactory source, in others a tungsten filament bulb is used, and in still others, a high-intensity source, such as a tungsten-halogen quartz lamp, is required. Those skilled in the art will readily determine the proper type of source required for a given application. A source of coherent light may be preferred in certain applications.

Plano-convex lenses having a short focal length are preferred, for the simple reason that it makes the source and sensing units less bulky. Of available short focal length lenses, lenses of the Fresnel type are preferred due to their low cost and availability in a very wide range of sizes (such lenses are commonly employed in large searchlights, aircraft beacons and marine lighthouses, to name three large-scale applications). A fresnel lens comprises a concentric series of simple lens sections and combines thinness with short focal length and large diameter. As pointed out in more detail hereinbelow, in many applications of the present invention only a relatively thin plane of light is required to span the viewing area, and so only a pair of lens segments is needed. In this connection, flat, plastic Fresnel lenses are preferred, in that they are readily shaped by cutting. The short focal length of these lenses is additionally advantageous in the present invention as the sensor becomes highly directional and, in effect, "ignores" extraneous light.

The ability to achieve a linear or analog response is a feature of the present invention, and two types of masking are required. First, the field of view should have an elongated regular shape such as a rectangle. This is most easily accomplished by cutting the lens to the desired shape, but need not be. Second, the filament "hot spot" and other inherent non-uniformities must be eliminated. This is done with a mask described hereinbelow in connection with FIG. 3.

The sensor will be chosen so as to be compatible with the other elements of the system, most particularly so as to avoid any possibility of burn-out. Only a single light sensitive element is employed, whether it be a photocell, phototransistor or other device. In certain applications where the field of view is exceptionally deep, or for other reasons the quantity of light sensed is but a very small fraction of the source light, use of a photodarlington or photomultiplier device may be called for.

In most industrial environments the ambient light conditions are essentially constant and orders of magnitude less than the intensity across the viewing area. However, suitable shielding and light-absorbing material are readily employed which serve to exclude extraneous light without adding to cost. As noted above, a feature of the short focal length lens is the directionality it imparts to the system.

FIG. 1 illustrates the essential elements of the invention. A light-tight enclosure 10 has a lens 12 mounted in one face thereof, lens 12 being preferably a Fresnel lens. Inside the enclosure a light source 14, an incandescent bulb as shown, is located at the focus of lens 12. The dotted line 16 indicates the field of view, i.e., the collimated beam issuing from lens 12.

A second enclosure 18 has a lens 20 identical to lens 12 mounted in the surface thereof opposed to enclosure 10 and in alignment with field of view 16. Within enclosure 18 and at the focus of lens 20 a support 22 holds the photosensitive element (not shown). To illustrate a typical application of the invention, a moving web of material in an industrial process is formed into a loop 24 between two processing stations or between portions of a processing station. Loop 24 may be a textile, paper, thin metal strip or other material handled in web form. As loop 24 drops across field of view 16, the amount of light reaching the photosensitive element is reduced, proportionately reducing its electrical output. This can be used, for example, in conjunction with a silicon controlled rectifier (SCR) to increase the speed of a take-up reel, thus raising loop 24.

It will be noted that lenses 12, 20, being round, will not produce a linear output from the photosensitive element since more light is blocked near the center of the field of view, per unit of downward loop movement, than at the bottom or top. To produce a linear output the surface of lens 12 is masked in the manner described below.

FIG. 2 shows in more detail an embodiment of the invention. In FIG. 2, a source unit 26 and a sensing unit 28 define a large area field of view 30 therebetween. Source unit 26 is painted flat black on the interior walls (or covered with black felt or the like). A plexiglass window 32 is mounted in one wall for passage of source light. The light source 34 is adjustably mounted on the wall opposite window 32. In this instance, the source is a 5 volt T-1 bulb with a 100,000 hour life, and is connected to a 117 volt line 36 through a transformer or dropping resistor 38. The Fresnel lens segment 40 is adjustably mounted within source unit 26 with source 34 at its focus. The lens segment 40 was cut from a 1/32 inch thick flat plastic lens supplied by Cryton Optics, Rosyln Heights, N.Y.

The enclosure of light sensor unit 28 is identical with source unit 26, and includes plexiglass window 42. The lens 44 adjustably mounted therein is also identical with lens 40 except that it is not masked, and of course lesn 40 is oriented to perform a dispersing and collimating function while lens 44 is oriented to perform a converging function. The sensor 46 is adjustably mounted at the focus of lens 44, on a circuit board 48. A reversing switch 50 is desirably wired into the circuit, so the sensor output can either increase or decrease with the interposition of an object in the field of view. A sensitivity adjusting potentiometer 52 is another desirable feature.

It will be noted that problems with extraneous light are eliminated by the light absorbing interior walls and by the elongated shape of enclosure 28, which prevents any extraneous light that does enter from being focused on the sensor.

The rectangular shape of lens segment 40 is shown in FIG. 3, which also shows the area of masking 54, which eliminates the filament "hot spot" and produces a uniform light intensity across the entire field of view. As shown, the rectangular lens is divided into quadrants by two diagonals, and the quadrants including the long sides of the lens are blacked out. Those skilled in the art will determine the precise mask shape required for a particular lens size and shape.

FIG. 4 illustrates sensor circuitry used with the invention. In the circuit shown, the sensor 46 is a QS100 series phototransistor from Quantum Sensing, Inc., Bohemia, N.Y. and the circuit is designed to replace the speed control potentiometer on an S/100 model SCR controller from Dodge Motor Control (Division of Reliance Electric).

The switch 50, in the position shown in FIG. 4, provides an output inversely proportional to the light sensed (i.e., a decrease in light sensed produces an increased output). In the other position the response is direct. It will be noted that in one position the output is base-emitter and in the other it is base-collector. In either case the signal passes variable resistor 52, which provides a sensitivity control, and a power transistor emitter follower 54 which provides gain. The output is a trigger pulse for the SCR motor control.

Sensitivity of the sensor system of the present invention demands a relatively large viewing area, at least compared to the size of the sensing unit. In the embodiment described, a lens 7 × 1 inch is preferred, and about the minimum effective size is about 2 × 1/4 inches for a linear output. In contrast the active area of the sensor 46 measures 80 mils square.

Figure 5:
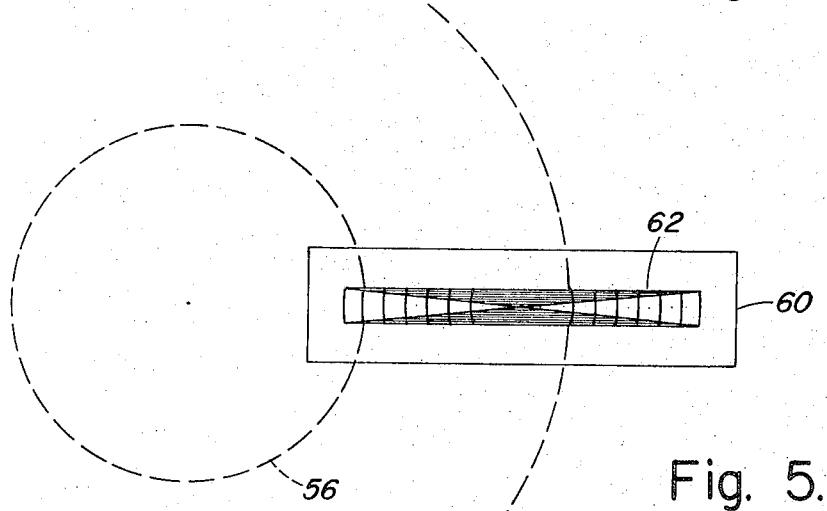
FIG. 5 is a schematic drawing showing an application of the invention to the speed control of a take-up reel winding a moving web of material.

In the handling of web materials having appreciable tensile strength, tensioned take-up reels are a common expedient. They automatically adjust their speed to the output of the processing station as well as changing reel speed required by the changing roll diameter as material is wound thereon. Tensioned take-up reels cannot - or should not - be used with fragile materias because of the hazard of tearing. In FIG. 5, there is illustrated an embodiment of the invention which will automatically adjust the speed of a take-up reel to that required for the roll diameter at any point. As shown in dotted lines, a roll 56 is winding up a web of material 58. An enclosure 60 has in the front surface thereof a masked diametral lens segment 62 and is located in the plane of any radius of roll 56 (the segment 62 is the portion of a full circular lens between two parallel chords equidistant from the lens center and may be as broad or narrow as desired). Lens 62 projects a wide, flat, essentially rectangular field of view, and the amount of light reaching the sensing unit (not shown) is inversely proportional to the amount of material on roll 56 (i.e., as the roll grows in diameter, the light reaching the sensor diminishes proportionally). The output of the sensing unit, again through an SCR, controls the speed of the drive motor on the take-up reel.

It will be appreciated that any variation in the intensity of the source will affect the output, so the voltage across the light should be constant. However, in applications where the source voltage may vary, this can be cancelled out in the following manner. A second sensor identical to the first sensor is located within the light source enclosure at a position where it can "see" the source. This second sensor forms part of a bridge circuit with the first sensor output in a manner which will automatically cancel any change in the source intensity.

Various changes in the details, steps, materials and arrangements of parts, which have been herein described and illustrated in order to explain the nature of the invention, may be made by those skilled in the art within the principle and scope of the invention as defined in the appended claims and their equivalents.

I claim:

1. An optical sensing system comprising:
   a light source;
   a first, short focal length lens of the Fresnel type comprising a diametral segment of elongated, rectangular shape;
   said light source being located at the focal point of said first lens;
   a single light sensor;
   a second lens identical to said first lens and having said light sensor at its focal point;
   said first and second lenses being spaced from each other in axial alignment to define a field of view therebetween illuminated by light originating from said source, collimated by said first lens and focussed by said second lens onto said sensor;
   mask means on said first lens eliminating inherent non-uniformities of illumination across said field of view, said mask means covering the two quadrants reaching the long sides of said lens;
   said sensor producing an electrical signal proportional to the amount of light focussed thereon by said second lens.

2. The sensing system as claimed in claim 1, and additionally comprising a first enclosure containing said source and said first lens, and a second enclosure containing said sensor and said second lens, said enclosures including windows for passage of light between said lenses.

* * * * *